Patented Nov. 24, 1942

2,303,209

UNITED STATES PATENT OFFICE 2,303,209

LEATHER TANNING AND FINISHING

John Marshall Grim, Stamford, Conn., assignor to American Cyanamid Company, New York, N. Y., a corporation of Maine No Drawing. Application March 5, 1941,
Serial No. 381,843

2 Claims. (Cl. 149—5)

This invention relates to the tanning and finishing of hides and leather by the incorporation therein of synthetic tanning agents containing aminotriazine-formaldehyde condensation products. The invention includes the synthetic tanning agents themselves, their methods of preparation, and processes of tanning and finishing hides and leather employing them.

I have found that synthetic tanning agents of the type of formaldehyde condensation products of aromatic sulfonic acids are improved in color and light stability by the incorporation of aminotriazine-formaldehyde condensation products therein. The formaldehyde reactive aminotriazines are those which contain one, two or three amino groups and include such compounds as melamine, ammeline, ammelide, formoguanamine, acetoguanamine and their substitution products such as 2-chloro-4,6-diamino-1,3,5-triazine and the like. I have discovered that when substantial quantities of one or more of these compounds, either singly or in admixture, are incorporated into synthetic tanning agents of the above-described type, the resulting product has a much better color and resistance to discoloration upon storage or upon exposure to light and will produce leather of a correspondingly lighter shade.

It is known that aminotriazines of the above-described class can be reacted with formaldehyde under neutral, alkaline and acid conditions. In preparing synthetic tanning agents containing ammeline-formaldehyde condensation products it is preferable to react the ammeline with formaldehyde that is neutral or alkaline, as otherwise insoluble polymerization products are obtained unless a large excess of formaldehyde is used. This is particularly true in cases where formaldehyde is reacted with a mixture of an aminotriazine such as ammeline and an aromatic sulfonic acid, since the sulfonic acids have a tendency to act as acid catalysts and accelerate the polymerization of the aminotriazine-formaldehyde condensation product. The same is true of other aminotriazines of the above-described class; either a large excess of formaldehyde must be used in the condensation or care must be taken to avoid premature polymerization of the condensation product.

Although synthetic tanning agents falling within the scope of my invention in its broader aspects may be prepared by simple admixture of unpolymerized or incompletely polymerized aminotriazine-formaldehyde condensation products with the known class of synthetic tanning agents described above, this frequently leads to irregular and inferior results. I have found, as one of the most important features of my invention, that synthetic tanning agents of much better properties are obtainable by first condensing an aminotriazine such as ammeline, melamine, formoguanamine and the like with an excess of formaldehyde and then reacting the condensation product containing the excess formaldehyde with a phenol sulfonate, sulfonated aromatic hydrocarbon or other synthetic tanning agent of the desired class. Preferably the desired amount of aminotriazine is added at about 50° C. to the entire amount of formaldehyde used in preparing the syntan and the mixture is agitated at this temperature until a clear solution is obtained. This solution is then added slowly and with good agitation to the aromatic sulfonic acid and the condensation reaction is completed by continued agitation at lower temperatures or by long standing.

Another method which may be employed in preparing the improved synthetic tanning agents of my invention involves the simultaneous reaction of an aromatic sulfonic acid and an aminotriazine with formaldehyde. When aromatic sulfonic acids such as phenol sulfonic acid or naphthalene sulfonic acid are used the condensation is preferably carried out at lower temperatures such as at room temperature. Syntans prepared by this method may be employed both for the bleaching of chrome tanned leather to improve the color thereof and as synthetic tanning agents for tanning picked or depickled hides and skins.

In preparing synthetic tanning agents of improved properties with the aid of aminotriazine-formaldehyde condensation products I have found that the greatest improvement in color and color stability is obtained when at least 15% of the aminotriazine is present, based on the weight of the aqueous formaldehyde solution used. In most cases, improved color and stability are obtained with somewhat greater amounts, on the order of 20–30% of aminotriazine, and of course even larger quantities may be added if desired. However, it is usually desirable to employ the minimum amount of aminotriazines consistent with the desired improvement in the product, since these compounds are at present fairly expensive, and therefore 20–30% may be regarded as the optimum quantities.

A large number of synthetic tanning agents of the class consisting of formaldehyde condensation products of aromatic sulfonic acids are known, and any member of this class may be employed in practicing the invention. Thus, for example, the formaldehyde condensation products of sulfonated phenol, sulfonated cresols and sulfonated cresylic acid, and sulfonated aromatic hydrocarbons such as benzene, naphthalene, anthracene and the like are at present in wide commercial use as synthetic tanning and finishing agents, and it is an important advantage of my invention that any of these may be improved by incorporating substantial quantities of aminotriazine-formaldehyde condensation products therein. When the resulting composition is employed for the tanning and finishing of hides and leather, the finished product is also correspondingly improved in color and light resistance.

The invention will be illustrated in greater detail by the following specific examples. It should be understood, however, that these examples are given primarily for purposes of illustration and that the invention in its broader aspects is not limited thereto.

Example 1

3 parts by weight of ammeline were stirred to a paste with 4 parts of phenol monosulfonic acid and 4 parts of 37% aqueous formaldehyde solution were stirred in at room temperature. The paste soon dissolved to form a clear solution which was found to have good properties when tested as a bleaching agent for chrome tanned leather.

30 parts by weight of chrome tanned side leather were drummed for one hour in a bath containing 5 parts of the above condensation product and 100 parts of water and then washed and dried. The leather bleached by this process was considerably lighter in color than the original unbleached stock.

Example 2

63 parts by weight of ammeline were heated with 150 parts by weight of 37% formaldehyde and the mixture was refluxed until a clear solution was obtained. It was then cooled and neutralized by the addition of 12 parts by weight of a 50% NaOH solution. 32 parts by weight of phenol monosulfonic acid were then neutralized with 12 parts of the same NaOH solution and added to the ammeline-formaldehyde syrup after which the mixture was heated at 80° C. for 5 minutes to allow the phenol sulfonate to react. The resulting solution had a pH of 7.6 and was found to have good bleaching properties for chrome tanned leather when tested by the procedure outlined in the preceding example.

Example 3

20 parts by weight of phenol monosulfonic acid were neutralized by the addition of 16 parts of a 50% sodium hydroxide solution. 52 parts by weight of a 50% ammeline-formaldehyde syrup having a pH of 7.5 and a molar ammeline-formaldehyde ratio of 1:4 were then added with stirring. A clear stable syrup having a pH above 7.0 was formed, which was found to have good properties both as a tanning agent for depickled hides and as a bleaching agent for chrome-tanned leather.

Example 4

820 parts by weight of naphthalene beta sulfonic acid were dissolved in 770 parts of water heated to 90° C. and 16 parts of activated carbon were added. In a separate reaction vessel 68 parts by weight of melamine were added to 370 parts by weight of 37% aqueous formaldehyde heated to 50° C. and the mixture was agitated at this temperature for about one-half hour until a clear solution was obtained. This solution was then slowly added to the hot naphthalene sulfonic acid-activated carbon mixture and the formaldehyde condensation was completed by heating at 90–92° C. for an additional 20 hours. The condensation product was then added to a solution of 810 parts by weight of ammonium hydroxide in 1000 parts of water and the resulting alkaline solution was filtered. The filtrate was further diluted with water to a total weight of 3200 parts.

The product was a synthetic tanning and bleaching agent of excellent color and color stability. When used for finishing chrome-tanned leather, preferably after acidification with sulfuric acid to a pH of 3–4.5 it was found to have excellent bleaching properties.

Example 5

430 parts by weight of o-amyl phenol were sulfonated by reacting with 553 parts of 66° Bé. sulfuric acid at 60° C. for 1.5 hours. In a separate vessel 42 parts by weight of melamine were added to 214 parts of 37% formaldehyde at 50° C. and the mixture was agitated at this temperature for about one-half hour until a clear solution was obtained after which it was cooled to 30° C.

240 parts of ice were added to the phenol sulfonate solution and the melamine-formaldehyde was then slowly added during 4–5 hours while maintaining the temperature at 30–35° C. after which the mixture was agitated at these temperatures for an additional 14 hours to complete the condensation. 300 parts of ice were then added and sufficient ammonium hydroxide was introduced to adjust the acidity to 0.5 normal. The product was much lighter in color than corresponding batches prepared by the same procedure without the addition of melamine.

100 parts by weight of chrome-tanned side leather was bleached for 30 minutes with 10 parts of the above-described syntan in a bath containing 200 parts of water and 0.18 part of sulfuric acid and washed with hot water. The resulting leather was light in color and possessed excellent stability against discoloration by sunlight.

What I claim is:

1. A process for tanning and finishing hides and leather which comprises impregnating them with an aqueous dispersion containing a synthetic tanning agent of the class consisting of formaldehyde condensation products of aromatic sulfonic acids and also containing an aminotriazine-formaldehyde condensation product.

2. A process for tanning and finishing hides and leather which comprises impregnating them with an aqueous dispersion containing a synthetic tanning agent of the class consisting of formaldehyde condensation products of aromatic sulfonic acids and also containing an ammeline-formaldehyde condensation product.

JOHN MARSHALL GRIM.